United States Patent [19]
Kwong

[11] 3,809,877
[45] May 7, 1974

[54] INDICATOR POINTER

[75] Inventor: Michael Kwong, Montreal, Quebec, Canada

[73] Assignee: Canadian Marconi Company, Montreal, Quebec, Canada

[22] Filed: Feb. 16, 1973

[21] Appl. No.: 333,405

[30] Foreign Application Priority Data
May 31, 1972 Canada .......................... 143813

[52] U.S. Cl. .............. 240/1 LP, 240/1 EL, 240/2.1, 350/96 R
[51] Int. Cl. .......................................... G01d 11/28
[58] Field of Search ................... 240/1 P, 1 EL, 2.1; 350/96 R, 96 B; 58/50 R

[56] References Cited
UNITED STATES PATENTS

| | | | |
|---|---|---|---|
| 3,651,634 | 3/1972 | Cooper | 350/96 B X |
| 3,574,992 | 4/1971 | Ladas | 58/50 R |
| 3,611,359 | 10/1971 | Panerai | 350/96 R X |
| 2,619,068 | 11/1952 | Malheiros et al. | 240/1 EL X |
| 3,466,928 | 9/1969 | Kind | 360/96 B X |
| 3,715,822 | 2/1973 | Hansen, Jr. et al. | 350/96 R |
| 3,718,814 | 2/1973 | Van Slyke | 350/96 B X |

Primary Examiner—Richard M. Sheer
Attorney, Agent, or Firm—Alan Swabey

[57] ABSTRACT

Apparatus for providing an expanding or contracting line of light for use as a pointer in an analog display device. The apparatus comprises a strip of fused fibre optic material housed in an opaque plate, and a light plate, comprising a series of light bulbs in intimate contact with the back side of the opaque plate. In one embodiment, the light bulbs are directly behind the strip of fibre optic material, while in another embodiment the light bulbs are off-set in alternating arrangement with respect to the fibre optic material. An embodiment wherein only every second bulb is activated, to thereby give a dotted effect, is also taught.

3 Claims, 5 Drawing Figures 7   10   11   8

INDICATOR POINTER

BACKGROUND OF THE INVENTION

1. Field of the Invention

This invention relates to an illuminatable path adapted to be used as a pointer in an analog display device. More specifically, this invention relates to such an illuminatable path comprising a strip of fused fibre-optic material.

2. Description of the Prior Art

Although it is known to use fibre optic material as illuminatable paths in analog displays, the prior art displays use segments or bundles of fibre optic cord, attached together, with each segment being activated by at least one light source. The production of the prior art devices presents difficulties in the handling of the segments. In addition, the alighment of the segments is difficult and uncertain. Again, because the segments are constrained to a minimum length and the illuminating light bulbs are constrained to minimum diameters, the resolution of the prior art devices is limited.

OBJECTS OF THE INVENTION

It is therefore an object of the invention to provide an analog display as above-described wherein the difficulties relating to the handling of fibre optic segments or bundles of the prior art devices is eliminated in the production thereof.

It is a further object of the invention to provide an analog display as above-described wherein the problem of alignment is eliminated.

It is a still further object of the invention to provide an analog display as above-described wherein the resolution can be substantially increased.

SUMMARY OF THE INVENTION

These, and other objects which will become clear below, are accomplished, in accordance with the invention, by replacing the fibre optic segments with a strip of fused fibre optic material, and adapting the housing and illuminating arrangements therefor, to accept and co-operate with such strip.

All of the above objectives are met with a device in accordance with the invention. By using a fused fibre-optic strip, the handling of the fibre optic is simplified as it is now possible to handle a strip which is long relative to the size of the segments used in the prior art devices. In addition, in accordance with the invention, the strip is placed in a machined insert, so that the alignment there of is automatic. By novel placement of the light sources, which activate the fibre optic strip, the resolution of the device can be made smaller than the diameter of each light source.

BRIEF DESCRIPTION OF THE DRAWINGS

The invention will be better understood by an examination of the following description together with the accompanying drawings in which.

DETAILED DESCRIPTION OF THE DRAWINGS

Figure 1:
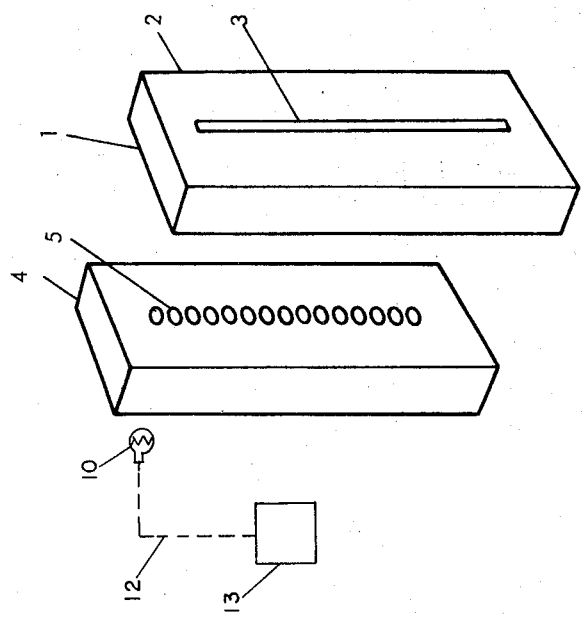
FIG. 1 illustrates one embodiment of the invention.
Figure 2C:
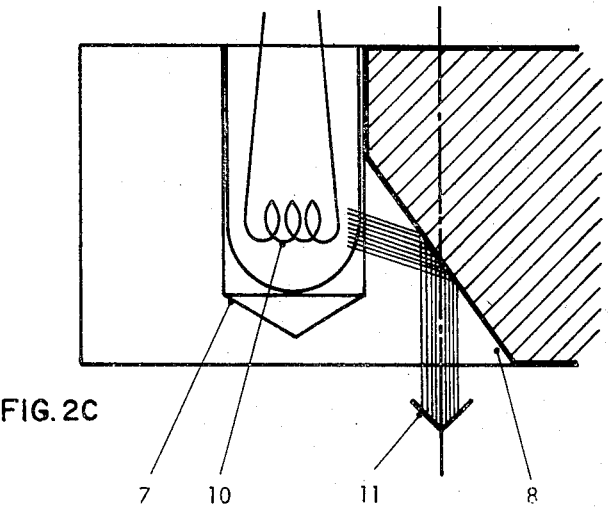
FIG. 2 illustrates a preferred embodiment of a light guide plate in accordance with the invention.
FIGS. 2A and 2B illustrate a section of the preferred embodiment taken along lines A—A and B—B.
Figure 2A:
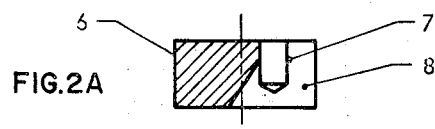
Figure 2B:
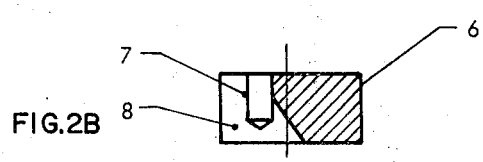
Figure 2:
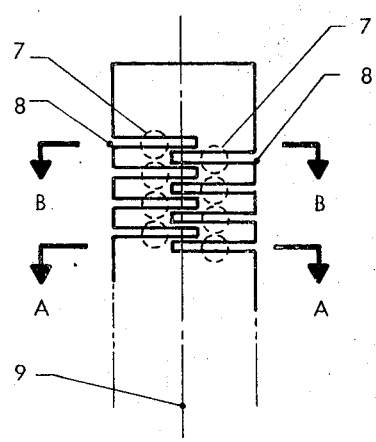

Referring now to FIGS. 1, 2 is the front face of a plate, which may be opaque, and which will either comprise the whole of or a part of the front of a display device utilizing the invention. A machined insert 3 is adapted to receive a fused fibre optic strip. A light plate 4 contains a series of closely drilled holes 5 each of which is adapted to receive a light bulb 10 (only one of which is shown. Electrical connections 12 (one of which is shown) for providing power to the bulbs are connected through logic circuitry 13 which controls the number of bulbs to be turned on and the specific bulbs to be so turned on.

In operation, the front of the plate 4 is placed in intimate contact with the back of the opaque mask 1. When a light bulb is turned on, that segment of the fused fibre optic strip directly in front of the light bulb will be illuminated. In preferred embodiments, it is contemplated that adjacent light bulbs will be turned on or off one after the other, with the bulbs being turned on one after another in one direction only, and the bulbs being turned off one after another in the other direction only. This arrangement gives the impression of an expanding or contracting line of light and can be used, with a scale alongside the strip of fused fibre optics, in an instrument environment.

It may, for other purposes, be desirable to turn the light bulbs on in other than a serial order, and such an arrangement would be within the scope of the instant invention.

FIG. 2 illustrates a preferred light plate in accordance with the invention. The plate 6 in FIG. 2 comprises two rows of closely drilled holes 7, both rows being offset from the center of the plate. A slot 8 is associated with each hole 7 as is best illustrated in both sections A—A and B—B in FIGS. 2A and B. As can be seen, the bottom surface of each slot is inclined upward towards the top surface of the plate 6. Because of this arrangement, and because of the nature of the inclined surface, light 11 from a bulb 10 (refer to FIG. 2C) will be reflected to appear at a straight line 9 along the center of the plate. As can be seen in FIG. 2, the diameter of each hole is greater than the width of each slot, however, the image of each bulb will appear only in its associated slot and will have the width only of its associated slot. Thus, the resolution is improved. That is, the increments by which the illuminated length of the fibre optic strip can be increased is made smaller.

Figure 3:
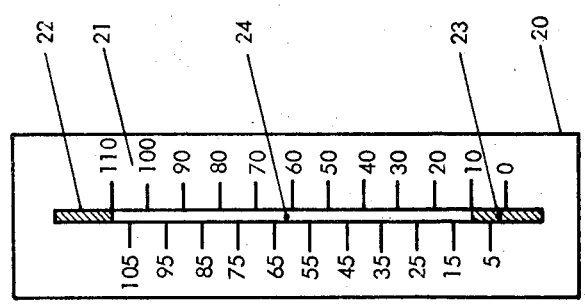
FIG. 3 illustrates a scale face in accordance with the invention.

FIG. 3 shows how the invention would be used in association with a scale. A scale face 20, which can either be painted onto the opaque plate, or which could comprise a separate plate mounted on the front of the opaque plate, contains an opening 24 for the fibre optic strip. Scale numerals 21 are arranged as well known in the art, and danger regions 22 and 23 are separately indicated, usually by means of a red visual signal.

In accordance with a further embodiment of the invention, provision is made for separately and dramatically indicating the danger regions. In the regions 22 and 23, colored (preferably red) and white bulbs would be provided in alternating arrangement. Logic circuitry, adapted to connect electrical power to the bulbs, would be arranged so that, when a reading is in a danger region, both the red and white bulbs in that region would be turned on. However, when the reading goes out of the danger region, then only the white bulbs in that region would be turned on. In this way, when there is a reading in the danger regions, a red indication will be given. But if the reading is, for example 30, then only a white line will extend from the bottom of the scale up to the 30 mark.

In the illustrated scale, it would be possible to have only red bulbs in the region 22 as the only time any part of that region must be illuminated is when the reading exceeds 110, i.e., when it reaches the danger level. Thus, there will never be any requirement for white bulbs in that region.

In a further embodiment, only every second bulb will be activated along the length of the illuminated line, except for, say the four or five adjacent the top bulb, giving a dotted effect. This not only provides an attractive effect, but also saves substantially 50 percent on power requirements.

The reason for activating a block of bulbs adjacent to the top bulb is to provide a block of light adjacent to the read-out to make the read-out more discernible. A block of four will be activated when the readout is adjacent a normally activated bulb, and a block of five when the read-out is adjacent a normally non-activated bulb.

Logic circuits will control which bulbs are activated — and blocks of more or less than the above-mentioned four or five are within the scope of the invention.

Although several embodiments have been discussed above, this was for the purpose of describing, but not limiting the invention. Modifications which may come readily to the mind of one skilled in the art are considered to be within the scope of the invention as defined in the appended claims.

I claim:

1. Apparatus for providing an expanding or contracting line of light for use as a pointer in a display device, said apparatus comprising a strip of fused fiber optic material; means for holding said strip of fiber optic material, said means comprising an opaque plate having a front face and a back face, said opaque plate further having an elongated opening therein extending from the front face to the rear face for receiving said strip of fused fiber optic material as an insert therein; means for illuminating selected portions of said strip of fiber optic material, said means comprising at least one series of closely spaced light bulbs; a light plate having a front face with a plurality of closely spaced openings therein for receiving said at least one series of closely spaced light bulbs; the front face of said light plate and the back face of said opaque plate being in intimate contact with said light bulbs directly opposite said strip of fiber optic material; and means for selectively turning said light bulbs on and off in a predetermined manner.

2. Apparatus as defined in claim 1, wherein the insert in said opaque plate forms a straight line and said at least are series of light bulbs forms a corresponding straight line so that when any one of the said light bulbs is turned on a portion of the strip of fused fiber optic material directly in front of it will be illuminated.

3. Apparatus as defined in claim 1, wherein the insert in said opaque plate forms a straight line and wherein said at least one series of light bulbs comprises two series of light bulbs, each series forming a straight line parallel to the other and being an equal distance from an imaginary straight line on the front face of said light plate but on opposite sides thereof; the insert in said opaque plate being in line with and directly in front of the imaginary line on the front face of said light plate when said plates are in intimate contact; said openings in said light plate being constructed so as to direct light from each of said light bulbs to a point in a plane containing the imaginary straight line so that when any one of said light bulbs is turned on a portion of the strip of fiber optic material directly in front of the opening containing that light bulb will be illuminated.

* * * * *